United States Patent [19]
Takahashi

[11] Patent Number: 6,062,250
[45] Date of Patent: May 16, 2000

[54] FUEL CUT DEVICE AND STRUCTURE FOR CONNECTING TOGETHER A PLURALITY OF FUEL CUT DEVICES

[75] Inventor: Jun Takahashi, Morioka, Japan

[73] Assignee: Mikuni Adec Corporation, Japan

[21] Appl. No.: 09/233,113

[22] Filed: Jan. 19, 1999

[30] Foreign Application Priority Data

Jan. 26, 1998 [JP] Japan ................... 10-012443

[51] Int. Cl.[7] ................................. F16K 24/04
[52] U.S. Cl. ................ 137/202; 137/43; 137/493.8; 137/587
[58] Field of Search ............ 137/43, 202, 493.8, 137/587

[56] References Cited

U.S. PATENT DOCUMENTS

| | | | |
|---|---|---|---|
| 3,548,847 | 12/1970 | Roven | 137/202 X |
| 4,679,581 | 7/1987 | Mears | 137/202 X |
| 4,989,629 | 2/1991 | Shirakawa | 137/202 |
| 5,782,258 | 7/1998 | Herbon et al. | 137/202 X |

*Primary Examiner*—Gerald A. Michalsky
*Attorney, Agent, or Firm*—Lorusso & Loud

[57] ABSTRACT

A fuel cut device has a body in which a gas vent passage having a plurality of ports is formed. A connecting portion is formed around one of the ports in a laterally oriented manner for fixing a separate two-way valve onto the fuel cut device. A plurality of thus-configured fuel cut devices are mounted within a fuel tank. The fuel cut devices are mutually connected by means of pipes fitted into the corresponding ports. Unused ports are plugged. The two-way valve is connected to the connecting portion of the fuel cut device adapted to communicate with an external device. The pipes used to connect the fuel cut devices does not include a connection or a branch.

9 Claims, 6 Drawing Sheets

6,062,250

FUEL CUT DEVICE AND STRUCTURE FOR CONNECTING TOGETHER A PLURALITY OF FUEL CUT DEVICES

BACKGROUND OF THE INVENTION

1. Field of the Invention

The present invention relates to a fuel cut device for releasing fuel gas generated within a fuel tank of an automobile or a like apparatus to the exterior of the fuel tank as well as to a structure for connecting together a plurality of the fuel cut devices.

2. Description of the Related Art

To meet needs for improved riding comfort, the shape of a fuel tank of an automobile has tended to become complicated and flat. Specifically, in recent years there has been used a fuel tank whose top surface has concave and convex portions. In such a fuel tank, air or evaporated fuel is trapped within the convex portions. Accordingly, the trapped gas must be released from the fuel tank. Each convex portion, therefore, is equipped with a fuel cut device for releasing gas from the fuel tank and for preventing fuel from flowing out from the fuel tank.

Japanese Patent Laid-Open (kokai) No. 7-293385 discloses an arrangement of a plurality of fuel cut devices on a fuel tank. FIG. 6 shows the structure for connecting together the fuel cut devices of the disclosed invention. FIG. 7 shows a fuel cut device equipped with a two-way valve and used in FIG. 6.

In FIG. 6, two fuel cut devices 62 and a single fuel cut device 64 equipped with a two-way valve (hereinafter referred to as a valved fuel cut device 64) are mounted on the top surface of a fuel tank 60. The fuel cut device 62 has a conventionally known structure. Specifically, the fuel cut device 62 includes a float valve (not shown) which, when fuel enters the fuel cut device, floats on the fuel and moves upward and downward according to fuel level. When the float valve moves downward, a fuel gas vent port is opened to permit release of fuel gas to a canister (not shown). When the float valve moves upward, the fuel gas vent port is closed to prevent fuel from flowing out therethrough.

The valved fuel cut device 64 is a combination of a mechanism of the fuel cut device 62 and a two-way valve 66 (having a known structure). The two-way valve 66 establishes bidirectional communication between the canister and the fuel tank 60 according to a pressure difference therebetween. A lower partition 68 and an upper partition 70 divide the interior space of the valved fuel cut device 64 into three chambers; namely, a lower float chamber 72, an intermediate chamber 74, and an upper two-way valve chamber 76. In the lower float chamber 72 is provided a conventionally known fuel cut valve mechanism 78 (having the same mechanism as that of the fuel cut device 62). The intermediate chamber 74 is connected to the fuel cut device 62 via a connection port 80. In the two-way valve chamber 76, the two-way valve 66 is provided. The two-way valve chamber 76 is connected to a canister via a vent port 82.

As shown in FIG. 7, the valved fuel cut device 64 is attached to the fuel tank 60 such that the connection port 80 and the vent port 82 are exposed above the fuel tank 60. Also, as shown in FIG. 6, each fuel cut device 62 has a single vent port 84 and is attached to the fuel tank 60 such that the vent port 84 is exposed above the fuel tank 60.

By means of piping 86, the vent ports 84 of the fuel cut devices 62 are connected together and to the connection port 80 of the valved fuel cut device 64. The vent port 82 of the valved fuel cut device 64 is connected to a canister (not shown) by means of a pipe 88.

In order to connect two fuel cut devices 62 to a single valved fuel cut device 64 by means of the single piping 86, the piping 86 has a single connection portion 90 (a T-shaped connection portion). When three fuel cut devices 62 are to be connected to a single valved fuel cut device 64, the piping 86 has two T-shaped connection portions or a single cruciform connection portion 90.

According to a conventional practice, as shown in FIGS. 6 and 7, the vent ports 84 of the fuel cut devices 62 and the connection port 80 and vent port 82 of the valved fuel cut device 64 are exposed above the top surface of the fuel tank 60. The piping 86 for connecting the vent ports 84 and the connection port 80 is also exposed above the top surface of the fuel tank 60.

Thus, an appropriate space must be reserved above the top surface of the fuel tank 60 in order to accommodate the portions of the fuel cut devices 62 and the portion of the valved fuel cut device 64 which project above from the fuel tank 60. As a result, the volume of the fuel tank 60 cannot be increased accordingly. Particularly, the connection port 80 and the vent port 82 of the valved fuel cut device 64 are located above the top surface of the fuel tank 60 and are arranged one above the other, with the result that the valved fuel cut device 64 projects far higher above the top surface of the fuel tank 60 than do the fuel cut devices 62.

Because of the incorporation of the two-way valve 66, the valved fuel cut device 64 has a body structure different from that of the fuel cut device 62. Accordingly, when a plurality of fuel cut devices are to be attached to the fuel tank 60, two kinds of fuel cut devices—the fuel cut device 62 and the valved fuel cut device 64—must be employed, resulting in an increase in cost as compared to a case wherein fuel cut devices of a single kind are employed.

Further, the piping for connecting a single valved fuel cut device 64 and a plurality of fuel cut devices 62 includes at least one connection portion 90. Formation of the connection portion 90 in the piping 86 involves processing such as cutting, drilling, and welding, thereby incurring processing cost.

SUMMARY OF THE INVENTION

In view of the foregoing, an object of the present invention is to provide a fuel cut device which permits mass production thereof through use of a single kind of die to thereby reduce manufacturing cost, which has a sufficiently low overall height to be housed within a fuel tank and to permit installation of piping for connecting together a plurality of fuel cut devices within the fuel tank, and which enables a reduction in piping work and sealing work to thereby reduce processing cost as well as to provide a structure for connecting the fuel cut devices together.

To achieve the above object, the present invention provides a fuel cut device comprising a body in which a gas vent passage having a plurality of ports is formed. The gas vent passage communicates with the exterior of the body via the ports. A connecting portion is formed around a selected one of the ports in a laterally oriented manner for fixing a separate two-way valve onto the body while establishing communication between the two-way valve and the selected port. Other ports can be connected to other fuel cut devices via corresponding pipes.

The present invention further provides a structure for connecting together a plurality of fuel cut devices comprising a piping structure for connecting together the fuel cut devices attached to a fuel tank. The fuel cut devices each comprise a body in which a gas vent passage having a plurality of ports is formed. A connecting portion for receiving a separate two-way valve is formed around one of the ports so that the two-way valve can be fixedly attached to the body via the connecting portion. The fuel cut devices are all identical, are mounted within the fuel tank, and are connected by means of pipes having no branch or connection.

According to the present invention, the fuel cut device is constructed such that the two-way valve is attachable thereto. Thus, in contrast with manufacture of conventional fuel cut devices employing dies of two kinds, the fuel cut devices of the invention can be manufactured through use of a single kind of die, so that manufacturing cost can be decreased through reduction in die cost.

Since the connecting portion for fixing the two-way valve onto the fuel cut device is formed in a laterally oriented manner, the two-way valve can be attached to the fuel cut device such that the two-way valve is oriented laterally with respect to the fuel cut device. Therefore, there can be prevented an increase in the overall height of the fuel cut device which would otherwise result from the attachment of the two-way valve. This arrangement enables installation of the fuel cut device within a fuel tank, thereby avoiding the condition that a portion of the fuel cut device projects from the top surface of the fuel tank. Accordingly, upon vehicle collision, a fuel tank shell protects the housed fuel cut device, thereby improving safety.

Further, since the piping does not include a branch or connection, pipe-sealing work is not involved, thereby reducing the cost of manufacturing the piping.

DESCRIPTION OF THE PREFERRED EMBODIMENTS

Embodiments of the present invention will next be described in detail with reference to the drawings.

Figure 1:
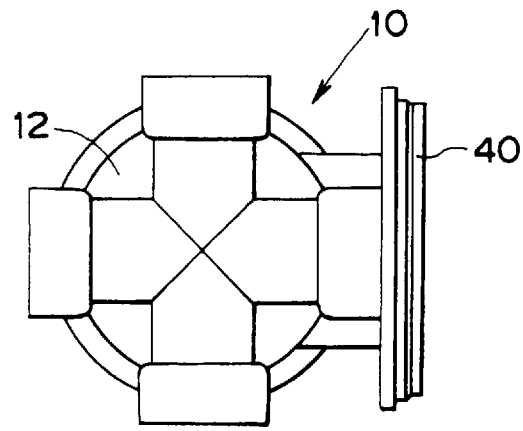
FIG. 1 is a plan view showing a fuel cut device according to an embodiment of the present invention.
Figure 2:
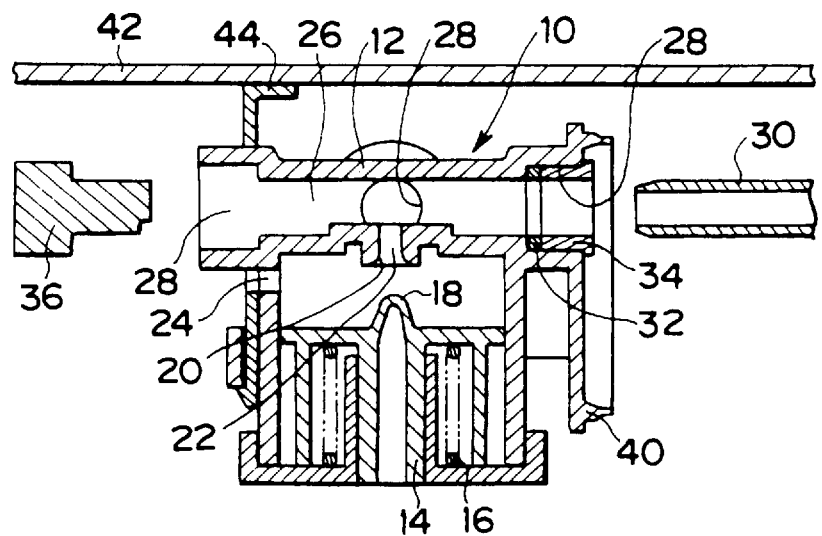
FIG. 2 is a vertical sectional view of the fuel cut device of FIG. 1.

As shown in FIGS. 1 and 2, a fuel cut device 10 includes a body 12, a float 14 which is vertically movable within the body 12, a spring 16 for urging the float 14 upward, a valve portion 18 formed at an upper portion of the float 14, a valve seat 20 formed in the body 12, a communication passage 22 formed in the valve seat 20 at a central position thereof, a gas intake hole 24 formed in the body 12 for establishing communication between the interior and the exterior of the body 12, and a gas vent passage 26 which communicates with the gas intake hole 24 via the communication passage 22. The mechanism of the thus-configured fuel cut device 10 is conventionally known. Specifically, when no fuel is present within the body 12 and thus the float 14 is positioned in a down position, fuel gas is released into the gas vent passage 26. When fuel enters the body 12 and thus the float 14 rises, the valve portion 18 closes the valve seat 20 to thereby prevent the fuel from entering the gas vent passage 26.

The gas vent passage 26 has a plurality of ports 28, which communicate with each other via the gas vent passage 26. In FIGS. 1 and 2, the fuel cut device 10 is depicted as having four ports 28. However, the number of the ports 28 is not particularly limited so long as at least two ports 28 are provided. The ports 28 open laterally (perpendicular to the vertical direction of FIG. 2) or downward, as will be described later.

All of the ports 28 have the same shape so as to receive a pipe 30 of the same shape. The port 28 which is to be engaged with the pipe 30 is equipped with an O ring 32, into which the pipe 30 is fitted, and a cylindrical retainer 34 for retaining the O ring 32.

Each port 28 which is not to be engaged with the pipe 30 is plugged with a plug 36. However, when the body 12 is manufactured through molding, each port 28 which is not to be used can be blinded through replacement of pins of a die, so that use of the plug 36 is not necessary. Through use of the same die, bodies 12 having two to four ports 28 can be manufactured. For example, when the body 12 having three usable ports 28 is to be manufactured, the port 28 which will not be used is blocked with the material of the body 12, either entirely or at an inward end portion, during manufacture.

Figure 3:
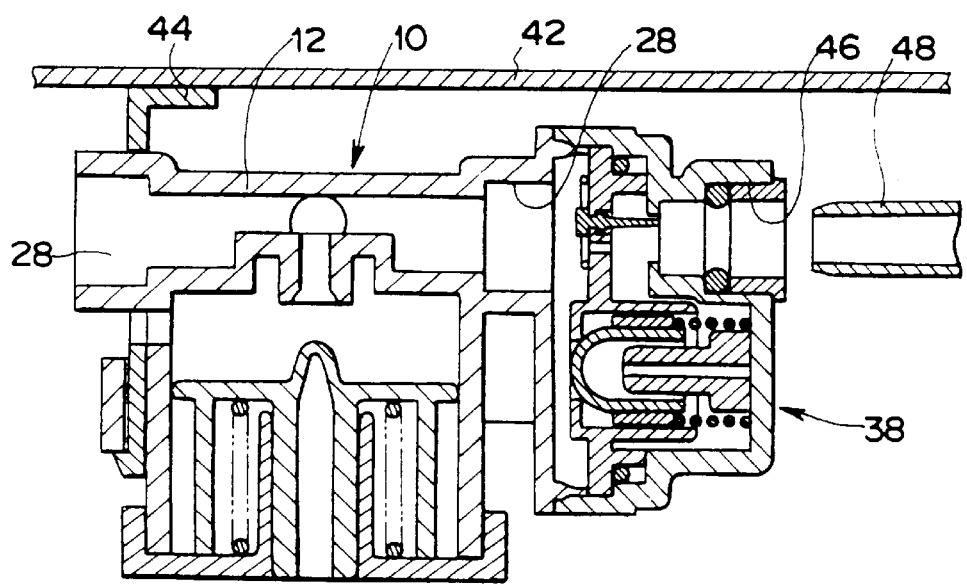
FIG. 3 is a sectional view showing a state in which a two-way valve is attached to the fuel cut device of FIG. 2.

A connecting portion 40 for fixing a separate two-way valve 38 (FIG. 3) onto the fuel cut device 10 is formed around one of the ports 28. The connecting portion 40 assumes a flange form. The two-way valve 38 is fixedly engaged with the connecting portion 40 through, for example, ultrasonic welding. FIG. 3 shows a state in which the two-way valve 38 is fixed onto the fuel cut device 10. Since the two-way valve 38 has a known structure, description thereof is omitted.

The connecting portion 40 may also assume an externally threaded flange form for screw engagement with the two-way valve 38. Alternatively, the connecting portion 40 may assume a concave shape.

Since the port 28 opens in the lateral direction of the body 12, the connecting portion 40 formed around the port 28 is oriented in the lateral direction of the body 12. Thus, the connecting portion 40 does not cause an increase in the overall height of the body 12. Accordingly, as shown in FIG. 3, even when the two-way valve 38 is fixedly attached to the fuel cut device 10, the overall height of the fuel cut device 10 remains unchanged.

As shown in FIGS. 2 and 3, the fuel cut device 10 and the fuel cut device 10 equipped with the two-way valve 38 are fixedly attached to a fuel tank 42 by means of a fitting 44. All of the fuel cut devices 10 are fixedly attached to the interior of the fuel tank 42. The height of the fuel cut device 10 is substantially identical to that of a fuel tank including a conventional valved fuel cut device. Thus, installation of the fuel cut device 10 within the fuel tank 42 raises no problem.

Figure 4:
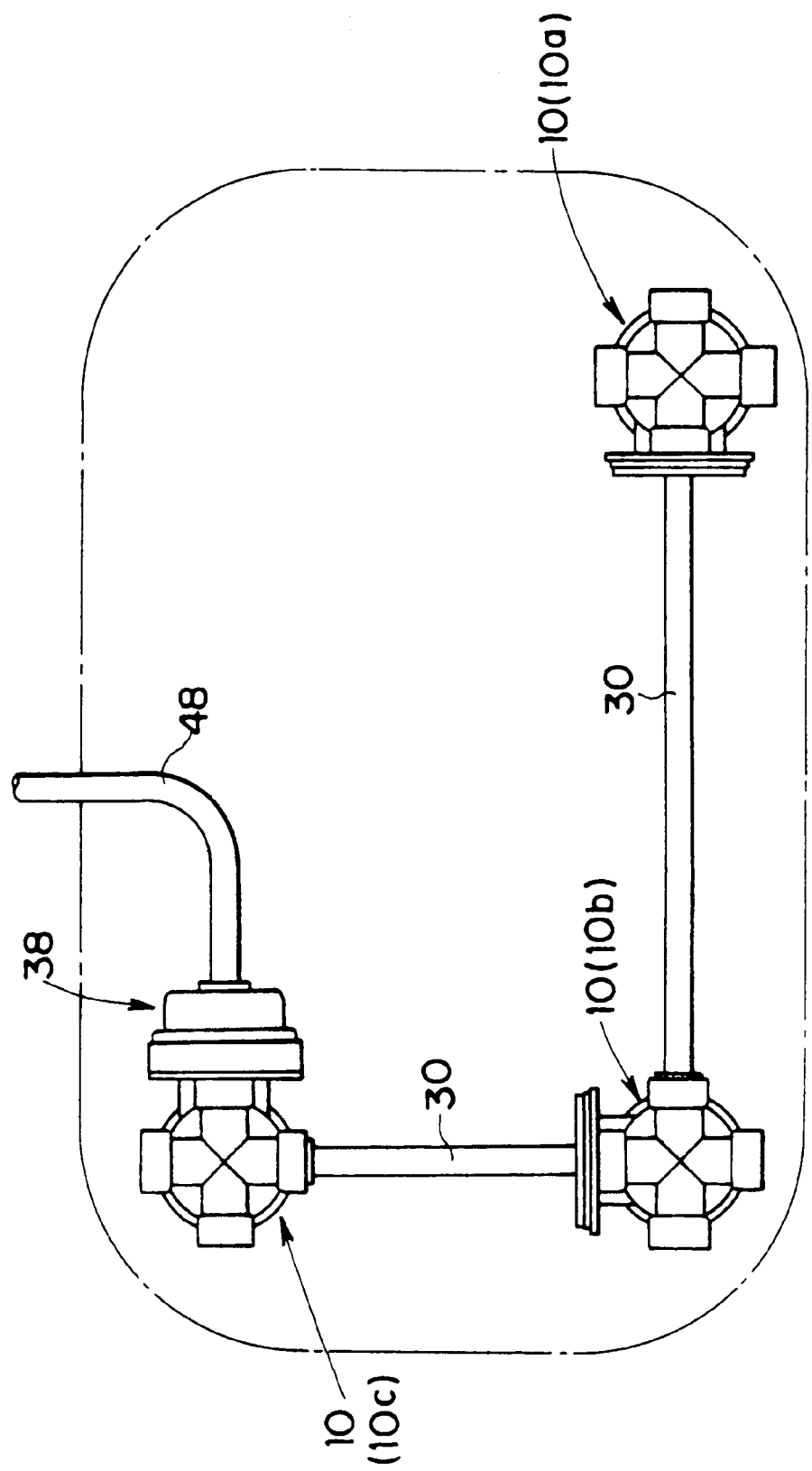
FIG. 4 is a plan view showing a structure for connecting together fuel cut devices according to the embodiment of the present invention.

FIG. 4 shows a state in which all of the fuel cut devices 10 are connected by means of the pipes 30. In the present invention, a plurality of fuel cut devices 10 are connected via the pipes 30. The pipe 30 has two openings only; in other words, the pipe 30 does not include a connection portion or a branch portion having a T-like shape or the like. For example, in FIG. 4 where three fuel cut devices 10 are provided, a first fuel cut device 10*a* (lower right of FIG. 4) and a second fuel cut device 10*b* (lower left of FIG. 4) are connected by means of the pipe 30, and the second fuel cut device 10*b* and a third fuel cut device 10*c* (upper left of FIG. 4) are connected by means of the pipe 30.

The two-way valve 30 is only attached to the third fuel cut device 10*c*, which communicates with an external canister (not shown). The two-way valve 38 shown in FIG. 3 has a port 46 which has a shape identical to that of the port 28 formed in the fuel cut device 10. To the port 46 is connected an external-connection pipe 48 for communication with the unillustrated canister located outside the fuel tank 42. The port 28 that opens to the two-way valve 38 establishes communication between the gas vent passage 26 and the two-way valve 38.

As a result, fuel gas in the first fuel cut device 10*a* is led to the third fuel cut device 10*c* via the second fuel cut device 10*b* and is then released to the canister via the two-way valve 38 and the external-connection pipe 48. Accordingly, the two-way valve 38 is operated under composite pressure of respective pressures in the gas vent passages 26 of the first, second, and third fuel cut devices 10*a*, 10 *b*, and 10*c*, respectively.

Figure 5:
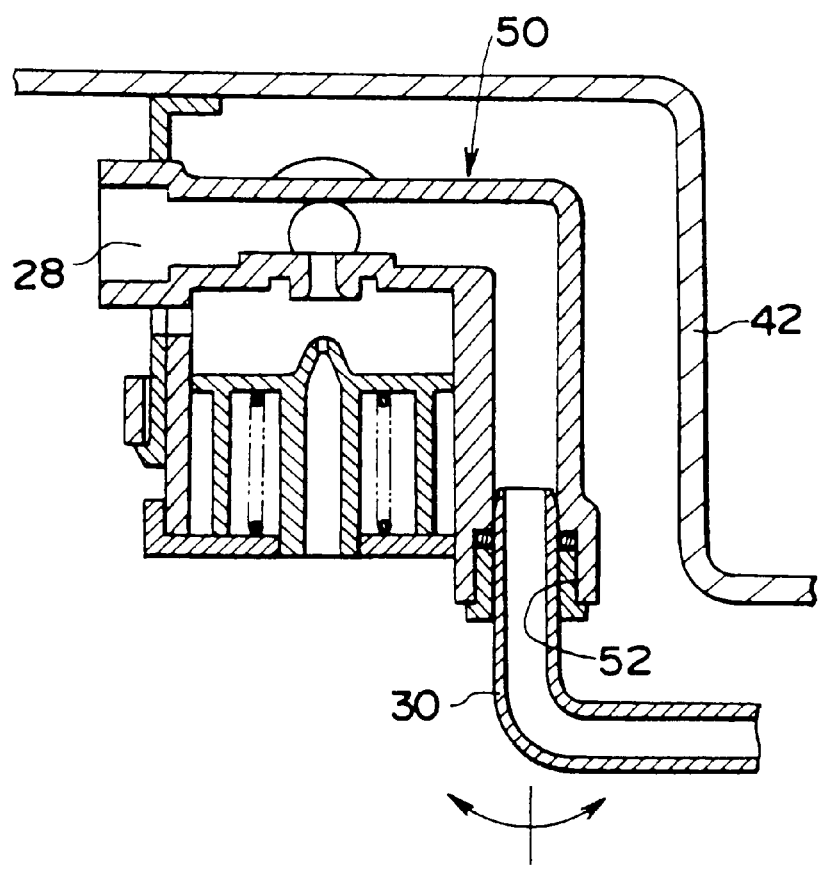
FIG. 5 is a sectional view showing a fuel cut device according to another embodiment of the present invention.
Figure 6:
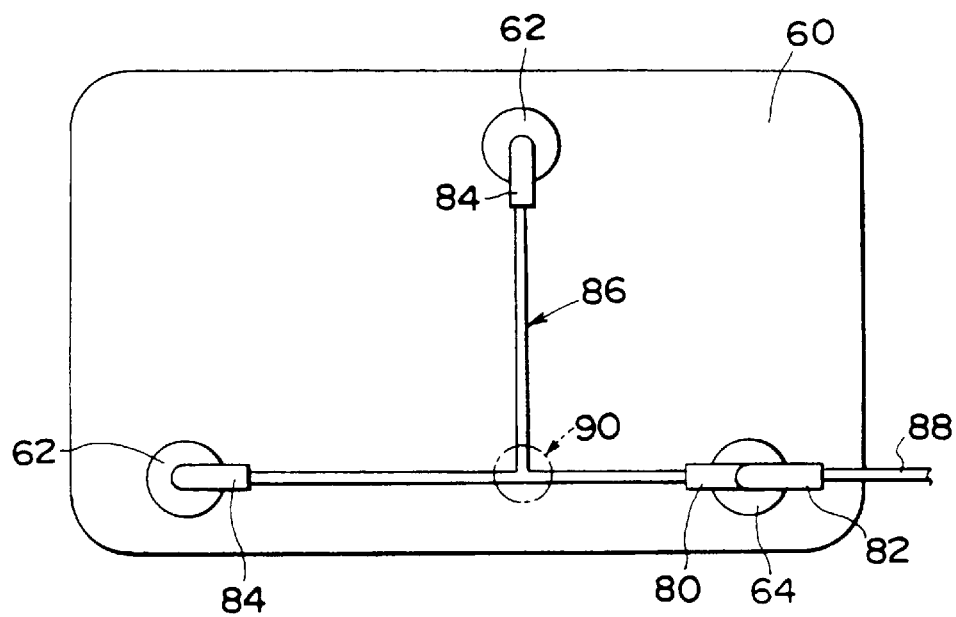
FIG. 6 is a plan view showing a structure for connecting together conventional fuel cut devices and a conventional fuel cut device equipped with a two-way valve.
Figure 7:
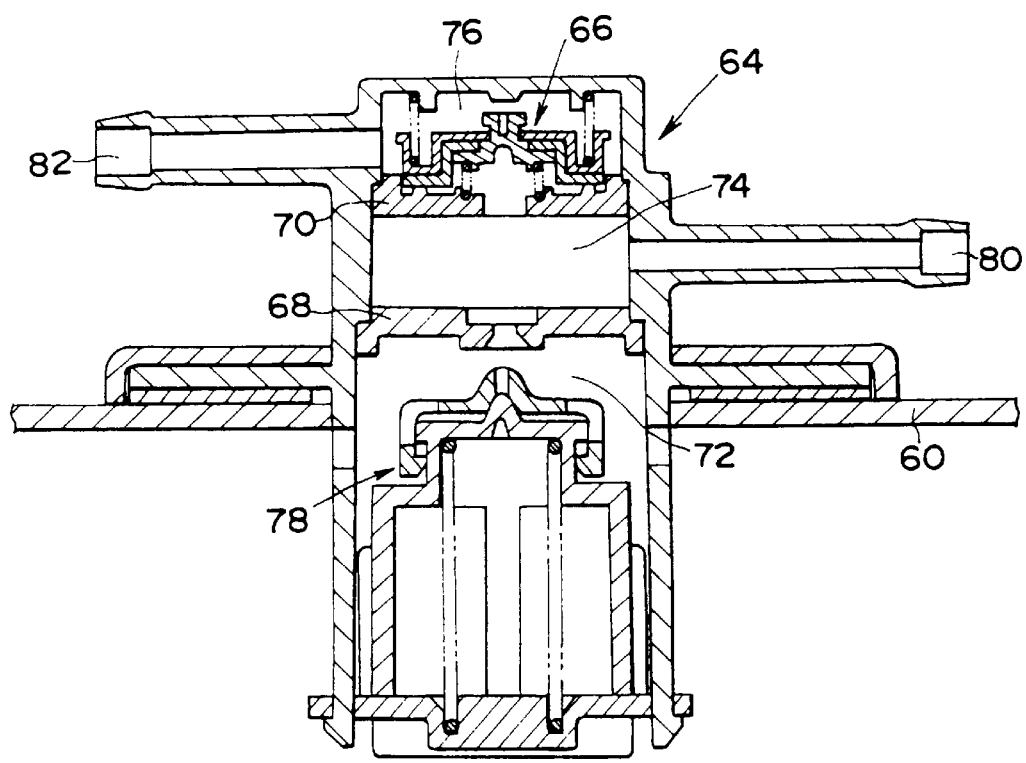
FIG. 7 is a sectional view showing the conventional fuel cut device equipped with a two-way valve.

Notably, at least one of the ports 28 may be oriented downward as represented by a port 52 formed in a fuel cut device 50 shown in FIG. 5. As shown in FIG. 5, even when a portion of the top surface of the fuel tank 42 is lowered below the laterally oriented port 28 in the vicinity of the fuel cut device 50, the downward oriented port 52 enables the connection of the fuel cut device 50 to another fuel cut device 50 through use of a single U-shaped pipe 30. Since the pipe 30 can be turned in any direction with respect to the port 52, installation of the pipe 30 is facilitated.

What is claimed is:

1. A fuel cut device for a fuel tank comprising:
   a valve body having:
      at least two gas vent passages which are interconnected and cross each other at an angle, each of said gas vent passages terminating at external ports located at opposing ends thereof, said external ports formed integral with said valve body and having a first diameter;
      a body portion having a hollow interior separated from said gas vent passages by a partition, said partition having an internal port extending therethrough and providing fluid communication between said gas vent passages and said hollow interior, with a valve seat formed in said partition surrounding said internal port and facing said hollow interior, said body portion having an opening for flow of gas from the fuel tank into said hollow interior; and
      a flange having a second diameter, larger than said first diameter, and surrounding one of said external ports, for receiving a two-way valve, whereby a two-way valve may be mounted integral with said valve body through a mating fit with said flange; and
   a float including a valve member and mounted within said hollow interior for reciprocating motion along a central axis between (1) an upper, closed position wherein said valve member is fully seated within said valve seat and blocks the fluid communication and (2) a lower, open position wherein the fluid communication is established, wherein said central axis is perpendicular to said gas vent passages.

2. A fuel cut device according to claim 1 further comprising a bushing inserted into a second of said external ports, said bushing having an internal O-ring for forming a fluid seal with a conduit inserted into said second external port.

3. A fuel cut device according to claim 1 wherein said angle is 90°.

4. A fuel cut device according to claim 1 further comprising a two-way valve integrated with said valve body by a mating fit with said flange.

5. A fuel cut device according to claim 1 wherein a second of said external ports is closed with a plug.

6. A fuel cut device according to claim 1 wherein a second of said external ports is oriented parallel to said central axis and opens downward.

7. A vent system for a fuel tank comprising, mounted in an upper surface of the fuel tank, one two-way valve and a plurality of spaced identical vent valves interconnected by conduits so that all of said plurality of vent valves vent through said two-way valve, each of said vent valves comprising:
   a valve body having:
      at least two gas vent passages which are interconnected and cross each other at an angle, each of said gas vent passages terminating at external ports located at opposing ends thereof, said external ports formed integral with said valve body and having a first diameter;
      a body portion having a hollow interior separated from said gas vent passages by a partition, said partition having an internal port extending therethrough and providing fluid communication between said gas vent passages and said hollow interior, with a valve seat formed in said partition surrounding said internal port and facing said hollow interior, said body portion having an opening for flow of gas from the fuel tank into said hollow interior; and
      a flange having a second diameter, larger than said first diameter, and surrounding one of said external ports, for receiving a two-way valve;
   a float including a valve member and mounted within said hollow body portion for reciprocating motion along a central axis between (1) an upper, closed position wherein said valve member is fully seated within said valve seat and blocks the fluid communication and (2) a lower, open portion wherein the fluid communication is established, wherein said central axis is perpendicular to said gas vent passages; and
   wherein said one two-way valve is mounted on one of said vent valves through a mating fit with said flange of said one vent valve.

8. A vent system according to claim 7 wherein said angle is 90°.

9. A vent system according to claim 7 wherein each of said vent valves further comprises:
   a bushing inserted into a second of said external ports, said bushing having an internal O-ring for forming a fluid seal with a conduit inserted into said second external port.

* * * * *